3,040,110
SYNTHESIS OF DIARYLETHANES
Ken Matsuda, Stamford, and George L. M. Christopher, Windsor, Conn., assignors to American Cyanamid Company, New York, N.Y., a corporation of Maine
No Drawing. Filed Sept. 30, 1959, Ser. No. 843,348
4 Claims. (Cl. 260—668)

This invention relates to a process of producing diaryl paraffins and, more particularly, to a novel process of producing unsymmetrical diarylethanes by the reaction of acetylene with a mono- or di-alkyl substituted benzene employing the catalyst β-chlorovinylmercuric chloride.

Paraffins having at least two carbon atoms and having two aryl substituents attached to one of said carbon atoms are known and may be produced by a number of different reactions employing a variety of catalysts. For example, a mono- or di-alkyl substituted benzene may be reacted with paraldehyde in the presence of hydrogen fluoride to form a 1,1-diarylethane. Another method involving the reaction of acetylene with a mono- or di-alkyl substituted benzene in the presence of a sulfuric acid-mercuric sulfate catalyst for the production of 1,1-diarylethanes is disclosed in U.S. Patent 2,734,928.

We have now discovered a novel catalyst which is of improved effectiveness for the reaction of acetylene with a mono- or di-alkyl substituted benzene in the production of unsymmetrical diarylethanes.

The diarylethanes produced in accordance with my invention may be used as such, e.g., as plasticizers in various resinous compositions, or they may be cracked to produce nuclear or side chain substituted styrenes which are polymerizable to form synthetic resinous compositions useful, for example, in the production of plastic films, castings and molded objects.

It is an object of the present invention to provide a method comprising the use of a novel catalyst for the production of paraffins having at least two carbon atoms and having two aryl substituents attached to one of said carbon atoms. It is a more particular object of the invention to prepare unsymmetrical diarylethanes by the reaction of acetylene with a mono- or di-alkyl substituted benzene in the presence of a novel catalyst therefor. These and other objects of our invention will be discussed more fully hereinbelow.

We have now found that the reaction of acetylene with a mono- or di-alkyl substituted benzene for the production of 1,1-diarylethane may be carried out in the presence of a catalyst comprising β-chlorovinylmercuric chloride in combination with concentrated sulfuric acid to produce excellent yields of diarylethanes. The β-chlorovinylmercuric chloride may be dispersed or dissolved in the concentrated acid or it may be dissolved in the substituted benzene and then introduced into the reaction zone for the production of the diaryl substituted paraffins or alternatively the β-chlorovinylmercuric chloride may be separately introduced into the reaction mixture containing the concentrated acid. Other methods of introduction of the catalyst into the reaction mixture will be apparent to those skilled in the art. To minimize formation of side reactions, a highly concentrated acid having concentrations of from about 85% to about 105% and preferably from about 88% to about 98.5% are employed in the instant process. The amount of acid that is used in the reaction may vary over rather wide limits, for example, from about one part of acid per part of substituted benzene charged to about one part of acid to about 25 parts of substituted benzene charged. However, it is preferred that from about 1:12 to about 1:3 parts of concentrated acid be employed per part of substituted benzene.

β-Chlorovinylmercuric chloride is soluble in toluene and can therefore be charged very conveniently to the reactor in toluene solution. Previous catalysts, such as mercuric sulfate, are substantially insoluble in toluene and only slightly soluble in sulfuric acid and therefore present considerable difficulty in handling and use. Mercuric chloride is soluble in toluene and may be used as a catalyst for reaction of acetylene and toluene but it is rapidly deactivated so that frequent additions are necessary to maintain a reaction of acetylene and toluene. β-Chlorovinylmercuric chloride, on the other hand, maintains its catalytic activity. Furthermore, the β-chlorovinylmercuric chloride catalyst has greater life and efficiency because it is less readily reduced to free mercury than mercuric sulfate. In addition, the preparation of β-chlorovinylmercuric chloride is less expensive than mercuric sulfate. It is readily prepared by addition of acetylene to an aqueous solution of mercuric chloride containing some NaCl and HCl at a temperature of about 40° C. The catalytic product is readily isolated by filtration and requires no further purification.

Examples of mono- and di-alkyl substituted benzenes that may be utilized in the process of our invention are such as toluene, o-, m- and p-xylenes, ethylbenzene and the like. Longer chain mono- and di-alkyl substituted benzenes such as butylbenzene may also be employed in the process of our invention.

A convenient method of carrying out the catalytic synthesis is to charge the desired amount of substituted benzene into a suitable reaction vessel which is then cooled to about 5° C. below the desired reaction temperature. Stirring of the substituted benzene is then begun and the sulfuric acid and catalyst then introduced therein. The reaction may be carried out at temperatures ranging from about —20° C. to about 100° C. Stirring of the mixture is maintained throughout the reaction to emulsify the acid and the hydrocarbons and to promote substantially complete circulation of catalyst in the reactor. When temperatures in excess of about 45° C. are employed, it is preferred that an acid such as phosphoric be utilized rather than sulfuric acid or if sulfuric acid is employed that its concentration be lowered somewhat, i.e., to about 85% due to the sulfonation effect of more concentrated sulfuric acid when employed at higher tempeartures. The desired calculated amount of acetylene is introduced into the reactor at a suitable rate. After the acetylene addition is complete, stirring of the reaction mixture is discontinued, the reaction mixture is separated into two layers, the organic layer washed with an aqueous caustic solution and the 1,1-diarylethane recovered therefrom by distillation. When temperatures approaching the boiling point of the aromatic hydrocarbon are utilized, it is more advantageous to conduct the reaction in a closed vessel under moderate pressures, i.e., in excess of one atmosphere and up to about 10 atmospheres. When the reaction is carreid out at below about —10° C. the reaction mixture is more difficult to work up and the separation of the acid layer from the desired product is slower.

Therefore, it is preferred that a temperature range of from about −10° C. to about 45° C. be employed in the process.

The following examples are given by way of illustration and not limitation in order that those skilled in the art may more fully understand the present inventive concept. All parts are parts by weight and should not be considered limitations unless so expressed in the appended claims.

EXAMPLE 1

*Preparation of β-Chlorovinylmercuric Chloride*

17.5 parts (0.300 mole) of sodium chloride is dissolved in 75 ml. of water and 5 ml. of concentrated hydrochloric acid is added. This solution is warmed to 30–40° C. and then 110 parts (0.406 mole) of mercuric chloride is added. Acetylene is passed into the solution with slow stirring at 30° C. After 20 minutes, precipitation starts and in 80 minutes the amount of precipitate becomes so large that stirring is no longer possible. The mixture is filtered and the solid is washed several times with water and then dried over $P_2O_5$. The dry product weighs 816 parts and melts at 131° C. Upon recrystallization from benzene-heptane the product melted at 123.2–124.5° C. More product may be obtained by treating the original reaction mother liquor with additional quantities of acetylene.

EXAMPLE 2

*Reaction of Toluene and Acetylene*

Into a suitable 3-necked reaction vessel equipped with a high speed stirrer, thermometer, gas inlet tube projecting to the bottom of the vessel, and a gas outlet tube connected to a wet test meter is charged 0.50 part of β-chlorovinylmercuric chloride prepared as described in Example 1 and dissolved in 1290 parts (14.0 moles) of toluene. This solution is cooled to −5° C. and to it is added 173 parts of 95.9% $H_2SO_4$. The temperature is adjusted to +5° C. and acetylene is passed in at the rate of 0.03 mole per hour for 70 minutes (total acetylene=2.10 moles) to the mixture while stirring vigorously. The temperature is maintained at +5° C. After all the acetylene has been added, the reaction mixture is stirred for 5 minutes. The reaction product is then diluted with 173 parts of water and placed in a separatory vessel. The upper organic layer is washed with 10% NaOH (200 parts) and distilled. 994 parts of toluene and 270 parts of 1,1-ditolylethane are obtained. When catalytically cracked in the vapor phase using water vapor as diluent, the 1,1-ditolylethane yields nuclear substituted methyl-sytrene monomer.

EXAMPLE 3

*Reaction of Ethylbenzene and Acetylene*

The procedure of Example 2 is repeated using, instead of the toluene, 1487 parts (14.0 moles) of ethylbenzene. 400 parts of 1,1-bis(ethylphenyl)ethane are isolated. When catalytically cracked 1,1-bis(ethylphenyl)ethane produces nuclear substituted ethyl styrene monomer.

EXAMPLE 4

*Reaction of m-Xylene and Acetylene*

The procedure of Example 2 is repeated with the exception that 1487 parts (14.0 moles) of m-xylene are employed instead of toluene. The yield of 1,1-dixylylethane is 450 parts. On cracking, the 1,1-dixylylethane yields the corresponding nuclear substituted dimethylstyrene monomer.

EXAMPLE 5

*Reaction of o-Xylene and Acetylene*

Upon repeating the procedure of Example 2 with 1487 parts (14.0 moles) of o-xylene instead of toluene, there was obtained 460 parts of 1,1-dixylylethane. This product cracks to yield the corresponding nuclear substituted dimethylstyrene monomer.

EXAMPLE 6

*Reaction of p-Xylene and Acetylene*

The reaction of acetylene according to Example 2, using p-xylene in place of toluene, yields 250 parts of the 1,1-dixylylethane. On cracking, this product yields the corresponding nuclear substituted dimethylstyrene monomer.

The theoretical stoichiometric ratio of the present reaction requires that two moles of the mono- or di-alkyl substituted benzene react with each mole of acetylene for the formation of the diaryl substituted paraffin. In order to obtain optimum yields of the diaryl substituted paraffin, it is preferred, however, that from about 15% to about 45% of the stoichiometric amount of acetylene theoretically required to react with all of the substituted benzene be employed herein. The concept of limiting stoichiometric amounts is more fully described and claimed in U.S. Patent 2,734,928. The limitation to between 15% and 45% of acetylene that is introduced into the reaction mixture substantially minimizes the occurrence of side reactions.

The process of our invention may be carried out as a batch, semicontinuous or as a single or multi-stage continuous operation. Inasmuch as a semicontinuous or batch operation inherently entails an increased number of manual procedural steps and a single stage continuous reaction produces lower yields, it is desirable to carry out the reaction in a multistage continuous reactor. In the multistage continuous reaction, the aromatic compound is passed through a series of reactors in which the aromatic compound is contacted with the catalyst, the latter may be either a liquid alone or mixed with the strong acid or with substituted benzene. It is preferred that the catalyst be introduced with a part of the substituted benzene as a continuous stream to each of the stages of the reactant which are provided with suitable mixing means. The resultant product is separated into a hydrocarbon layer and a catalyst layer and the latter is returned for further use in the process while the hydrocarbon layer is washed, dried and distilled to provide the diarylalkane product.

The catalytic conversion of diarylethanes prepared according to the invention is well known. Polymers prepared from the cracked product are useful for a variety of purposes for which resins are employed, e.g., as molding compositions, for coatings or as ingredients in surface coatings and the like. The Dixon U.S. Patents Nos. 2,422,163; 2,422,164; and 2,422,165 disclose a variety of catalysts which may be employed for the decomposition reaction in the catalytic cracking of these diaryl compounds. When the diarylethanes are cracked catalytically, a plurality of organic compounds is obtained. The mixture contains undecomposed diarylethane, the nuclear substituted styrenes and other alkyl-substituted compounds. For example, when the diarylalkane, 1,1-ditolylethane, is synthesized from acetylene and toluene and is then partially catalytically converted, the resulting mixture contains 1,1-ditolylethane, methylstyrene, a small percentage of ethyltoluene, toluene, 1,1-ditolylethylene and tarry material. Where a 1,1-dixylylethane is synthesized and converted, the resulting mixture contains undecomposed 1,1-dixylylethane, dimethylstyrene, a small amount of ethylxylene, xylene, dixylylethylene and tarry material.

It will be apparent that although specific details have been recited in the embodiments of the invention herein provided, it is possible to effect variations in details set forth without departing from the invention.

We claim:

1. In the preparation of a 1,1-diarylethane wherein acetylene is reacted with a member selected from the group consisting of mono- and di-alkyl substituted benzene, the improvement which comprises carrying out the reaction in the presence of a catalyst combination comprising β-chlorovinylmercuric chloride and sulfuric acid.

2. In the preparation of 1,1-ditolylethane wherein acetylene is reacted with toluene, the improvement which comprises carrying out the reaction in the presence of a catalyst combination comprising β-chlorovinylmercuric chloride and sulfuric acid.

3. In the preparation of 1,1-dixylylethane wherein acetylene is reacted with xylene, the improvement which comprises carrying out the reaction in the presence of a catalyst combination comprising β-chlorovinylmercuric chloride and sulfuric acid.

4. In the preparation of 1,1-bis(ethylphenyl)ethane wherein acetylene is reacted with ethylbenzene, the improvement which comprises carrying out the reaction in the presence of a catalyst combination comprising β-chlorovinylmercuric chloride and sulfuric acid.

References Cited in the file of this patent

UNITED STATES PATENTS

| | | |
|---|---|---|
| 2,734,928 | Smolin | Feb. 14, 1956 |
| 2,951,882 | Lawe | Sept. 6, 1960 |

FOREIGN PATENTS

| | | |
|---|---|---|
| 488/54 | Australia | Feb. 22, 1955 |